(12) United States Patent
Tye et al.

(10) Patent No.: US 8,927,081 B2
(45) Date of Patent: Jan. 6, 2015

(54) FLEXIBLE SEAM JOINT FOR USE IN ROBOTIC SKIN

(71) Applicant: Disney Enterprises, Inc., Burbank, CA (US)

(72) Inventors: Bryan S. Tye, Canyon Country, CA (US); Philip John Jackson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 12 days.

(21) Appl. No.: 13/792,648

(22) Filed: Mar. 11, 2013

(65) Prior Publication Data

US 2013/0189451 A1    Jul. 25, 2013

Related U.S. Application Data

(62) Division of application No. 12/970,641, filed on Dec. 16, 2010, now Pat. No. 8,429,806.

(51) Int. Cl.
*B44F 7/00* (2006.01)
*B29C 69/00* (2006.01)
*B29L 31/00* (2006.01)
*B29C 39/10* (2006.01)

(52) U.S. Cl.
CPC . *B44F 7/00* (2013.01); *B29C 39/10* (2013.01); *B29C 69/001* (2013.01)
USPC ........................................... 428/58; 403/364

(58) Field of Classification Search
CPC .. B29C 33/0033; B29C 33/005; B29C 39/12; B29C 65/562; B29C 65/564; B29C 65/76; B29C 67/0044; B29C 69/001; B29C 2793/009; B29C 70/681; B29C 70/72; B29D 7/01; B29L 2031/4835; B29L 2031/7028; B44F 7/00; B65G 15/32; B65G 17/06; B65G 2207/12; B65G 2207/48
USPC .............. 2/275; 264/138, 152, 154, 163, 238, 264/294; 403/266, 267, 364, 408.1; 428/16, 428/58, 61
See application file for complete search history.

(56) References Cited

U.S. PATENT DOCUMENTS

| 2,799,177 | A | * | 7/1957 | Henson | 198/847 |
| 3,212,627 | A | * | 10/1965 | Beebee | 198/847 |
| 3,664,490 | A | * | 5/1972 | Maruyama | 198/847 |
| 4,298,343 | A | * | 11/1981 | Redmond, Jr. | 474/255 |

(Continued)

*Primary Examiner* — Alexander P Taousakis
*Assistant Examiner* — Matthew P Travers
(74) *Attorney, Agent, or Firm* — Marsh Fischmann & Breyfogle LLP; Kent A. Lembke

(57) ABSTRACT

An artificial skin such as an outer covering or skin for an animatronic character. The skin may be formed by a method that includes providing a mold assembly with an exterior mold and a core. In the mold assembly, a cavity is formed between inner surfaces of the exterior mold and exterior surfaces of the core that defines the skin system. The mold assembly includes a seam-forming wall extending between the inner and exterior surfaces. The method includes inserting an elongate, tubular guide through holes in the seam-forming wall and pouring an elastomeric material into the mold to occupy the cavity between the exterior mold and the interior core. The method includes, after the material has hardened, cutting a seam in the skin system by cutting the material along the seam-forming wall. The tubular guide is separated into guide segments and a staggered joint is formed at the cut seam.

25 Claims, 6 Drawing Sheets

(56) References Cited

U.S. PATENT DOCUMENTS

| | | | |
|---|---|---|---|
| 5,328,349 A | 7/1994 | Minke et al. | |
| 2009/0289391 A1 | 11/2009 | Tye et al. | |
| 2009/0298034 A1 | 12/2009 | Parry et al. | |
| 2009/0301845 A1 * | 12/2009 | DeGroot et al. | 198/844.2 |
| 2012/0040150 A1 * | 2/2012 | Manninen | 428/195.1 |

* cited by examiner

FLEXIBLE SEAM JOINT FOR USE IN ROBOTIC SKIN

CROSS-REFERENCE TO RELATED APPLICATIONS

This application is a divisional of U.S. patent application Ser. No. 12/970,641, filed on Dec. 16, 2010, entitled "FLEXIBLE SEAM JOINT FOR USE IN ROBOTIC SKIN," which is hereby incorporated in its entirety by reference.

FIELD OF THE INVENTION

The present description relates, in general, to creating realistic skin for robots or for use with robotics or other applications in which skin or similar coverings are applied (e.g., robotics used to simulate movement of a human's or a character's face, hands, or the like), and, more particularly, to a skin or artificial skin system with a flexible joint adapted for joining two sides of a seam in the skin and to a method of forming such a joint in a skin.

RELEVANT BACKGROUND

Durable materials that are often also flexible and elastic such as plastics and rubbers are used in many applications to create coverings or skins that are applied over an internal physical support structure or skeleton. For example, artificial skins or skin systems are used to create realistic models of humans, animals, and characters, and, when combined with robotics, such models may accurately simulate live beings.

Robotics involves the design and use of robots to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like.

While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system, and the realism of the robotic figure or character may be furthered or hindered by the movements of the skin. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or more fanciful covering system such as a metallic suit or any other desired covering.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The skin typically is of a single material with one set of physical characteristics such as hardness, flexibility, and the like.

To initially assemble and then later maintain the robotics, the skin or skin system typically will include at least one seam where two portions or sides of the skin are joined together. In providing such a joint in the skin, it is desirable for the joint to be durable and lasting, for the joint to allow repeated use (e.g., opening and closing/mating of the joint) to allow the skin to be applied and removed numerous times, and for the joint to facilitate or at least not hinder realistic movement of the nearby skin or covered robotic components. For example, in a human-like character, a seam that has to be joined may be provided on the back of the neck so as to allow application and removal of a skin system over a robotic head. The robotics may require periodic maintenance such that the skin may be removed numerous times over the life of the robotic character. However, it is also very important for the joint on the neck to be formed so as to limit any interference or binding of the overall skin system that may be seen in the face, ears, top of the head, or front portion of the neck as this may spoil or reduce the realistic movement of the skin.

Presently, a number of join techniques are used in fabricating skin systems for robotics and other applications. One approach is to bond the two sides of the seam together such as by applying adhesive to two flat abutting sides after the skin is positioned over the robotic assembly or feature. Bonding can provide a relatively flexible joint, but it is typically undesirable as it can come apart over time and, more significantly, does not allow for opening and closing for access to the covered components. Stitching is sometimes used for joining a seam in skin, and a stitched seam provides some amount of stretching and twisting. But, stitched seams are typically not very durable as the stitching material quickly tears at the stitching holes with movement of the underlying robotics, causing the joint to fail over time.

In many skin systems, a conventional zipper is bonded into the seam during the molding process for a skin system, and then after application of the skin system, the zipper is used to open and close the seam of the skin system (such as for the back of a head or a wrist of a human robotic character). Zippers provide a strong and reusable joint. However, there are a number of problems with the use of zippers in many applications where realistic skin movement is required or desired. Fabrication can be time-consuming and difficult as the fabricator has to fully clean up the zipper to remove all skin material from its teeth and working parts to allow the zipper to work properly. The zipper is a foreign material or body that has to be molded into the skin, which is not sympathetic to the movement of the adjoining flexible skin material. As a result, the zipper may tend to tear out of the seam over time and repeated use. Further, zippers are a single body or member that tends to move as a unit such that the skin in the area near to the zipper may move in an unnatural or undesirable manner, e.g., a zipper in the back of a neck may move as a block with such movements being propagated to the front neck skin and facial features causing them to twist or pull in a non-realistic manner. Zippers typically are not flexible or pliable (e.g., readily able to stretch or "stretchy") so that, in addition to moving as a unit, the zippers can cause unnatural looking movement in adjoining areas of the skin.

Hence, there remains a need for improved methods for fabricating skin systems or simply "skins" for robotics and other applications that involve covering a support structure with a covering or skin. Preferably such methods would be inexpensive and relatively simple to carry out and would provide a joint for a seam in the skin that is flexible (e.g., move more naturally with the adjoining skin material) and also durable.

SUMMARY OF THE INVENTION

The present description addressed the above and other problems by providing a skin (and methods of making such artificial skin) that is useful for covering robotic mechanisms so as to allow ready access to the mechanisms. To this end, the skin includes a staggered joint made up of a number of peaks and valleys or tongue and groove joints. This joint, which is integrally formed with adjoining skin portions/sides of the seam, is formed through the use of a seam-forming wall provided on a surface of the molding assembly used during the pouring process for the skin.

In one case, the wall takes a repeating S-shaped pattern from end to end and extends up from an outer surface of the mold core (e.g., on a surface used to define a back of a neck when the robotic mechanism or assembly is used to provide a robotic head). Such a series of rounded or curved peaks and valleys (or tongues and grooves) may readily be joined and separated to allow application and removal of the skin to a robotic device but yet moves naturally with the surrounding skin and is very durable (less likely to tear or to have foreign materials work their way out of the moving skin system). Once closed or coupled, the joint may be retained in the closed position or state through the use of an elongate retaining member (e.g., a flexible fiberglass rod or the like) that is extended through the protruding peak elements or tongues via wear resistant guide segments provided in each of these elements/tongues such as via a tubular guide that is positioned in the mold assembly so as to extend through the accordion folds of the seam-forming wall prior to the pouring of elastomeric material to create the skin system.

More particularly, a method is provided for fabricating a product, such as a robot head, with an artificial skin system. The method includes providing a mold assembly with an exterior mold and an interior core. In the mold assembly, a cavity is formed between inner surfaces of the exterior mold and exterior surfaces of the interior core that defines a final shape of the skin system. The mold assembly includes a seam-forming wall extending between the inner and exterior surfaces. The method also includes inserting an elongate, tubular guide through a series of holes in the seam-forming wall and then pouring an elastomeric material (such as rubber, polyurethane, or the like) for the skin system into the mold to occupy the cavity between the exterior mold and the interior core. The method also includes, after the material has hardened to form the skin system, cutting a seam in the skin system by cutting the material along the seam-forming wall. During such cutting, the tubular guide is separated into a plurality of guide segments and a staggered joint is formed at the cut seam.

In some embodiments, the method includes removing the skin system from the mold assembly, applying the skin system over a robotic assembly with the staggered joint in an at least partially open state, placing sides of the seam together to place the staggered joint in a closed state, and inserting a flexible retaining member through the guide segments. In such cases, the tubular guide may be a tube of rigid material and the retaining member may be a flexible rod extending the length of the cut seam.

In some implementations of the method, the seam-forming wall follows or includes a pattern of repeating S-shapes from a first to a second end. In the method, the seam-forming wall may be configured to define a plurality of alternating tongues and grooves in each side of the cut seam, whereby the staggered joint comprises a plurality of tongue and groove joints. In such cases, each of the sides of the seam includes at least two of the tongues and two of the grooves and one of the guide segments is embedded in each of the tongues. In one exemplary implementation, the material used for the skin system is a rubber or polyurethane, and the method further includes inserting a flexible rod through the guide segments with the seam in a closed state, whereby the staggered joint is retained in a closed state and is concurrently allowed to move with adjoining portions of the skin system in two or more directions.

BRIEF DESCRIPTION OF THE DRAWINGS

FIG. 6 is a flow diagram for a process or method of fabricating a skin and applying the skin to a robotic assembly or component such as a wrist, a head/neck, or the like.

DETAILED DESCRIPTION OF THE PREFERRED EMBODIMENTS

Briefly, the following description is directed toward skin systems or, more simply, skins such as a unitary exterior skin layer for application over a robotic device (e.g., a robotic head, robotic-based hands and arms, and so on) and to methods of fabricating such skins or skin systems. It was recognized that there is a need for providing a seam in such skins that allows a skin to be applied to the robotic device by expanding its size temporarily and that then can be sealed together or "joined" to close the seam. In the past, these seams typically were joined using zippers that caused the skin to move in an unnatural manner and that typically failed over time.

In response to these and other issues, the following describes a seam with an integrally formed joint that closes or joins the seam in the skin with a staggered manner. The skin joint taught herein may be thought of as a joint assembly with a plurality of tongue and groove joints that allows two mating sides of the joined skin at the seam to be readily separated and then re-coupled together. In each tongue of the joint assembly, a tubular guide is provided such that, when all the tongues are positioned in corresponding or mating grooves to join the skin at the seam, an elongate retaining member (a flexible rod or the like) may be extended through all the guides to retain the tongues within the grooves (e.g., to retain the joint assembly in the coupled or closed position while allowing some amount of stretching, twisting, and other movement).

The staggered joint allows for natural movement in all directions. It is durable and easy to use. The joint can be used as a better and more robust alternative to zippers and other existing seam joining techniques. The staggered joint requires about the same amount of labor, if not less, to pour around a seam-forming wall provided in the mold (on the exterior surface of an inner core or inner surface of an exterior mold component) as pouring about a zipper. The staggered joint may be used to join a seam on a neck for a skin used to cover a robotic head and other skins used to cover robotics. In the case of human or human-like robotics, the staggered joint may be used on wrists, backs of arms, legs, and so on. The skin joined together with the staggered joint acts or moves as if the joined seam is not even there as the joint does not noticeably restrict movement of the skin.

Figure 1:
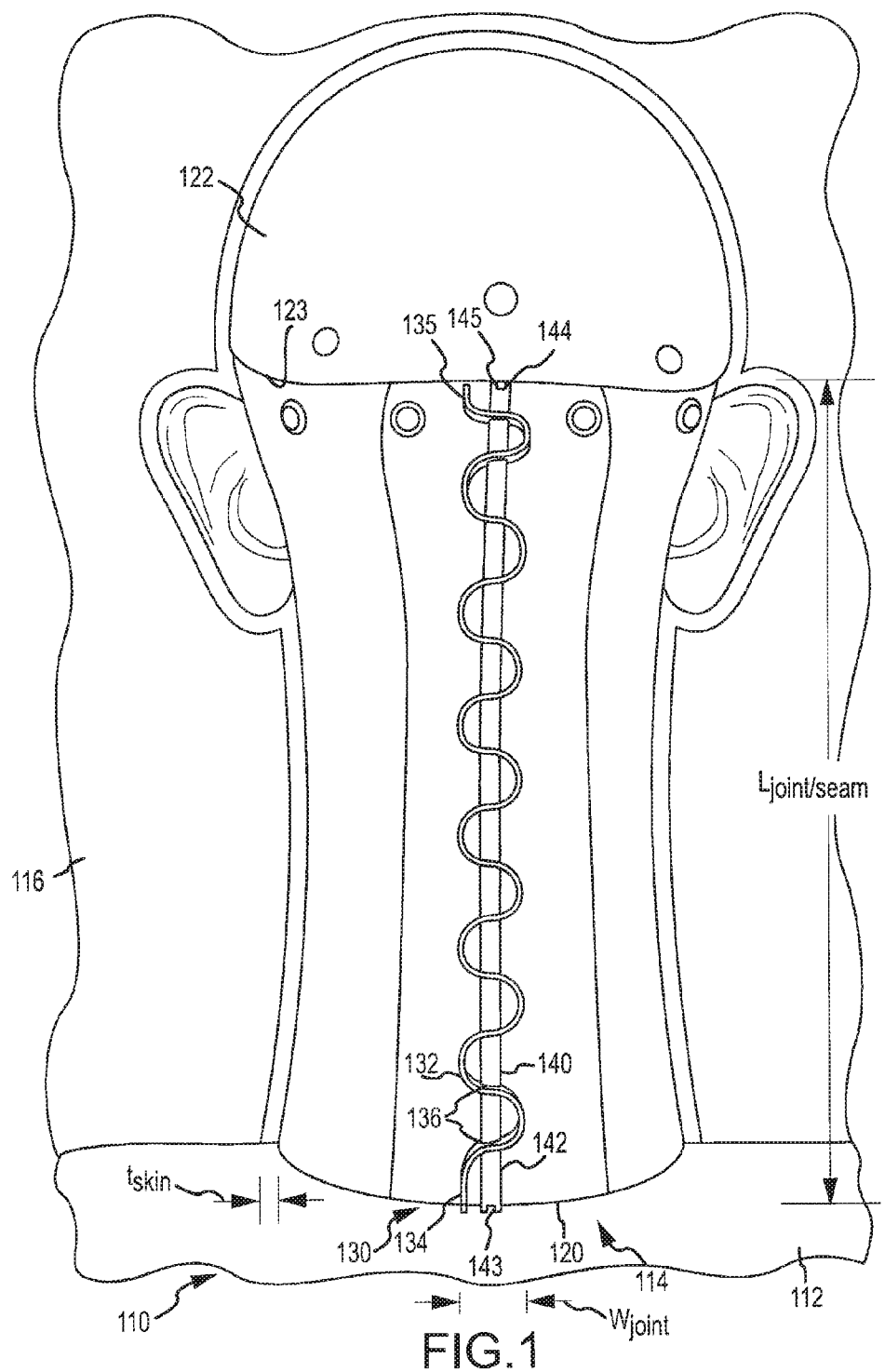
FIG. 1 illustrates a mold assembly for use in forming a skin or skin system with a flexible staggered joint as described herein, and the mold assembly is shown with a front half of an exterior mold in position on a base and a rear half removed to expose a portion of a mold core or inner support structure that includes a seam-forming portion of the core (although these seam-forming components could also be provided on an inner surface or wall of the exterior skin mold in some embodiments)

FIG. 1 illustrates a mold assembly 110 for use in forming a skin or skin system (not shown in FIG. 1) with a pour of flexible, compressible, and resilient material such as a rubber or a compound useful in forming life-like skins. As discussed above, the formed skin has a seam with an integral staggered joint or joint assembly, and the mold assembly 110 includes a seam forming assembly (or set of components) 130 to provide a staggered joint (or joint assembly with a plurality of tongue and groove joints) upon a pour using the mold assembly 110.

The mold assembly 110, in this example, is configured for use in forming a skin for covering a robotic head and to provide a seam with a reusable joint along a rear portion of the neck. The mold assembly 110 is shown to include a base or platform 112 and a core or inner mold component 114 is mounted onto the base 112. A front half 116 of an exterior mold assembly is also positioned on the base 112, with a rear half removed or not shown to expose the features of the seam forming assembly 130 and core 114. The core 114 has a rear neck surface or sidewall 120 that extends upward from the base 112 to an upper skull surface 122 with a ridge 123. The depth of the ridge 123 along with the spacing of the inner surfaces of the exterior mold away from the neck surface 120 (a mold offset distance) define a thickness, $t_{Skin}$, of a skin formed with the mold assembly 110. The skin thickness, $t_{Skin}$, may vary to practice the invention but typically will range from about 1/16 to about 1/4 inches depending upon the materials used for the skin and its intended uses.

Figure 2:
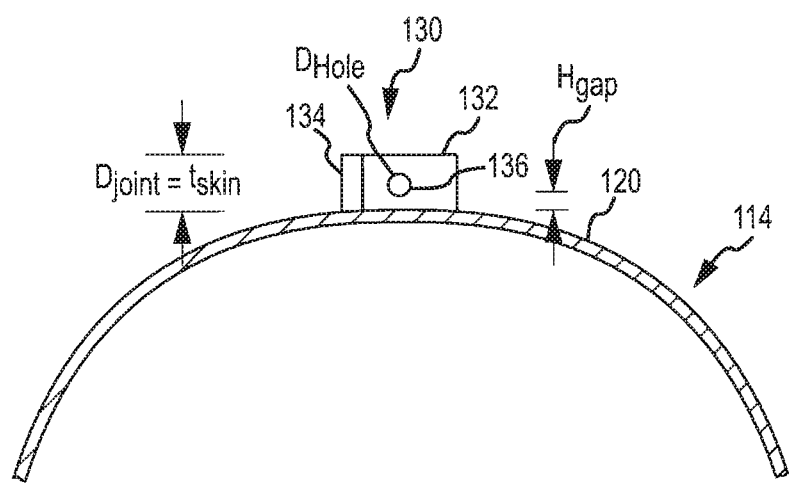
FIG. 2 is a partial end view of the core or inner support structure of FIG. 1 with the flexible guide removed showing more detail of seam-forming wall (e.g., recurring S-shaped wall used to form plurality of side-by-side tongues and grooves (or a "stacked" tongue and groove joint))

Significantly, the mold assembly 110 includes a seam-forming assembly 130 that is configured for forming a staggered joint in a seam in the skin formed with the mold assembly 110. As shown, the seam-forming assembly 130 includes a seam-forming wall 132 that extends outward from neck surface 120 of core 114 as shown in FIG. 2 such that the seam or joint has a height or distance, $D_{Joint}$, that is equal to the thickness of the skin, $t_{Skin}$. The wall 132 extends from a first end 134 adjacent or abutting the base 112 to a second end 135 adjacent or abutting the skullcap (or upper skin edge-defining) edge or ridge 123. In this manner, the wall 132 defines a seam or seam with an integral joint that has a particular length, $L_{Joint/Seam}$, that is chosen to facilitate ready application and removal of the skin system over a particular robotic device, and the length, $L_{Joint/Seam}$, typically will be larger for larger robotic devices (e.g., a length of 8 to 12 inches for a full size human head device and 3 to 6 inches for a full size human wrist or the like). However, the particular length of the joint is not limiting to the invention and neither is the thickness of the skin and associated seam/joint.

The wall 132 is not merely linear between the ends 134, 135 but, instead, is arranged in a zigzag pattern (or repeating S-shaped pattern). This pattern has a width between peaks and valleys (or tongues and grooves) that defines a resulting width, $W_{Joint}$, of the joint formed based on wall 132. Each repeated cycle or pattern creates two tongues and two grooves, with one tongue projecting in one direction and one tongue projecting in a second, opposite direction. Such an accordioned wall 132, thereby, defines a plurality of tongue and groove shapes that will be formed in the skin using mold assembly 110. The wall 132 may have a thickness that is great enough to define a seam or gap between the two sides or portions of the skin on either side of the wall 132 after pouring of skin material into the mold assembly 110 (e.g., to facilitate cutting or separation of the two skin portions or sides of the seam). The number (or density) of the tongue and groove joints in the seam may also be varied to practice the invention with 1 to 3 per inch being useful in some cases. The wall 132 typically is formed of the same rigid material as the core (e.g., a hard plastic or the like), and the wall 132 may be affixed to the neck surface 120.

According to another useful aspect of the invention, the mold assembly 110 is shown to include a guide member 140. The guide member 140 is used upon formation of the skin to provide a plurality of guide segments in the tongues that are used to guide a retaining member through the tongues and to provide wear-bearing surfaces in the skin material (e.g., to avoid tearing and the like)). The guide member 140 may take the form of a rigid, elongate tube such as a tube formed of abrasion resistant material that is very durable such as a peroxide-cured silicon tube (such as Versilic™ Silicone Tubing available from Saint-Gobain Performance Plastics (e.g., Formulation SPX-50) or other distributors) or the like. The guide member 140 in seam-forming assembly 130 is extended from a first end 142 through holes 136 in the wall 132 to a second end 145. To avoid the tubular guide member 140 being filled with skin material during a pouring operation, a plug 143 is provided on the base 112 at the first end 142 and a plug 144 is provided on ridge/edge 123 at the second end 145.

FIG. 2 illustrates the wall 132 from an end view (such as from the base 112) with the tubular guide member 140 removed. As shown, the sidewall 132 includes the holes 136 that each has a diameter, $D_{Hole}$, that is typically slightly larger than the outer diameter of the tubular guide 140. Further, the holes 136 are spaced above the neck surface 120 of the core 114 a distance, $H_{Gap}$, (such as one fifth to one fourth or more of the wall height, $D_{Joint}$) to define a height of a gap so as to embed the guide member 140 within the tongues of the skin to better retain each segment of the guide member 140 within a tongue during use of the skin. Likewise, the holes 136 are spaced apart from the top edges or sides of the wall 132 to position the holes 136 more centrally within the wall 132.

During use, the guide member 140, as shown in FIG. 1, is pushed or threaded through the holes 136 in wall 132 to mate with the plug 144 in edge 123, and, then, the core 114 with guide member 140 is placed on the base 110, which plugs end 142 with plug 143. The back or rear portion of the exterior skin mold may then be mated with base 112 and front portion 116 and the skin material poured into the gap provided about the inner core 114, which defines the shape and thickness of the skin as well as provides skin material that contacts the surfaces of the wall 132 and encapsulates the guide member 140.

Figure 3:
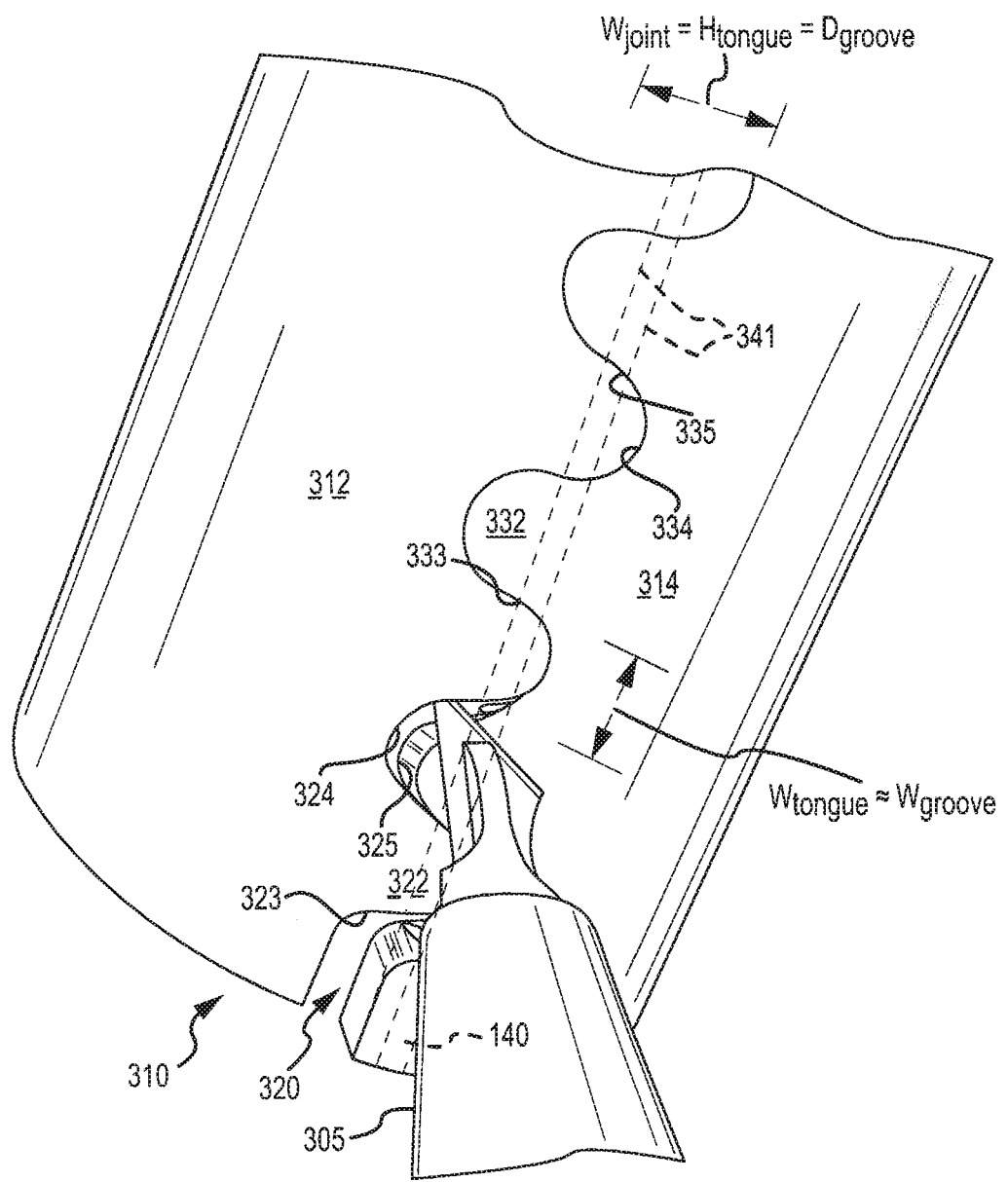
FIG. 3 is a partial view of a skin or skin system during the fabrication process specifically showing the skin after removal of the exterior mold and during cutting of the skin along the seam-forming wall (including cutting the flexible guide into a plurality of guide segments) to provide the flexible seam in the skin.
Figure 4:
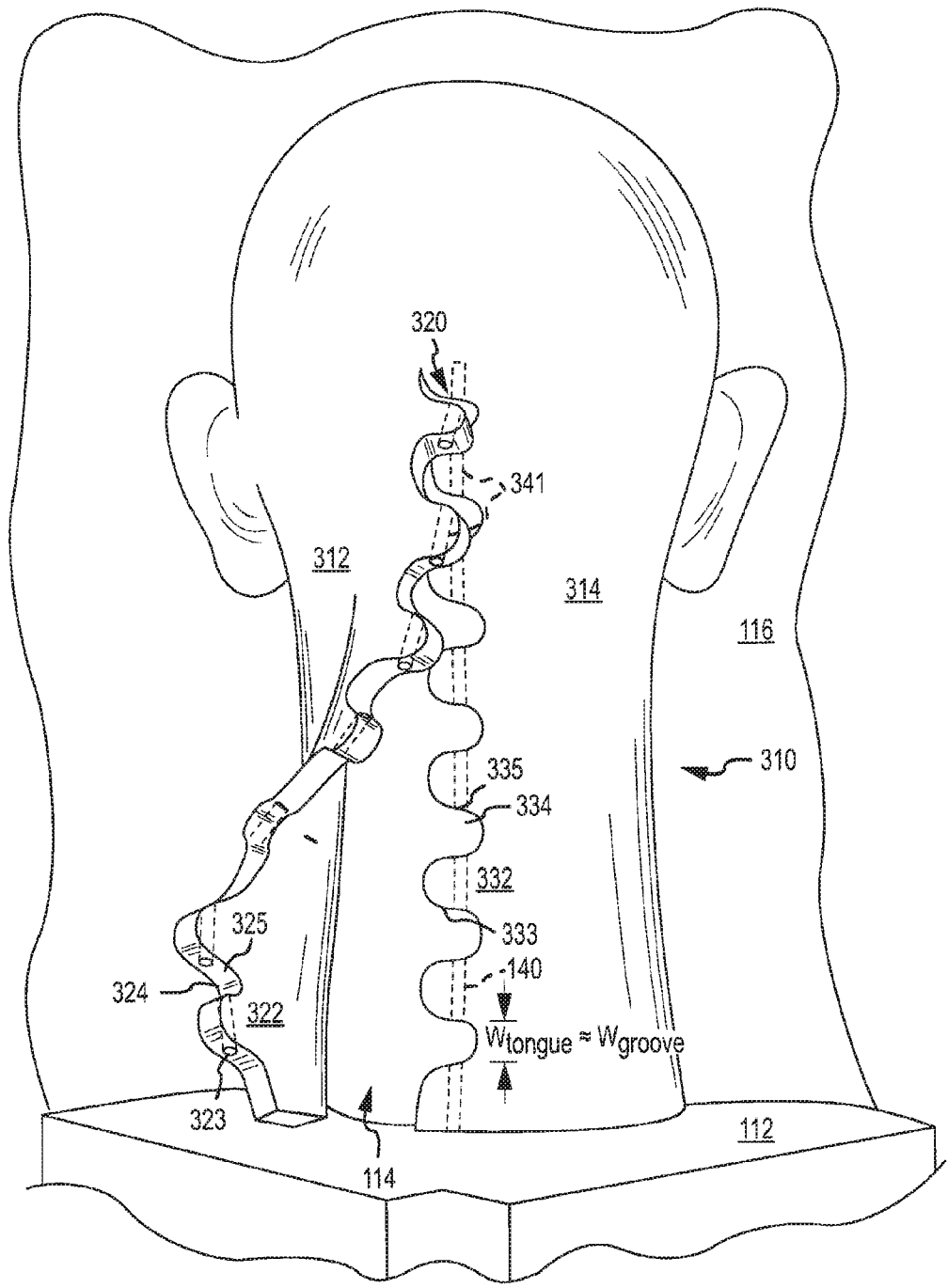
FIG. 4 is another view of the skin or skin system of FIG. 3 shown at a later stage in the fabrication process after the flexible seam has been cut to allow removal of the skin from the core showing a resulting seam providing an integral joint made up of a plurality of tongue and grooves (or a repeating S-shaped pattern)

FIGS. 3 and 4 illustrate a partial view of a skin or skin system 310 during an exemplary fabrication process of the present description. Specifically, the skin 310 is shown still on the core 114 but after removal of a rear or back exterior mold component. To create the staggered joint or seam 320 with integral tongue and groove joints, a cutting tool or knife 305 is shown in FIG. 3 being used to cut along the sides or surfaces of the seam-forming wall 132. This cutting operation cuts through the thickness, $t_{Skin}$, of the skin to form the joint 320 between a first portion or side 312 of the skin 310 and a second portion or side 314 of the skin 310. FIG. 4 illustrates the skin 310 after the cutting of the joint/seam 320 is completed to show how the joint/seam 320 allows the skin 310 to be removed from the core 114 and, then, applied to a robotic device (as shown in FIG. 5).

As shown, the skin 310 includes a joint 320 that is formed of a plurality of tongue and groove joints with each side 312, 314 including alternating tongue and groove pairs. For example, the joint 320 is provided in part with a tongue 322 and groove 324 pair on first side 312 of skin 310. The tongue 322 has a body with a height, $H_{Tongue}$, that is equal to or about equal to the width, $W_{Joint}$, of the joint 320, and the body of the tongue 322 has a shape defined by a sidewall 323 (which was defined in shape and configuration by the seam-forming sidewall 132). The groove 324 is defined by a sidewall 325 (which is defined in shape and configuration by the seam-forming sidewall 132) to provide a recess or valley in the side 312 that has the same shape and size as a tongue 322 so as to be able to receive such a tongue such as one on side 314 with a shape like tongue 322. The groove 324 has a depth, $D_{Groove}$, that equals (or nearly equals) the width, $W_{Joint}$, of the joint 320 as well as the height, $H_{Tongue}$, of a tongue (such as tongue 322) and has a width, $W_{Groove}$, similar to or matching (e.g., slightly larger) than the width of the tongues, $W_{Tongue}$. Likewise, the side or portion 314 of the skin 310 that mates or couples with the portion or side 312 has alternating tongues and grooves such as tongue 332 defined by sidewall 333 and groove 334 defined by sidewall 335.

As discussed above, the skin 310 includes the tubular guide 140 due to its insertion into the sidewall 132 of core 114 prior to the pouring or mold fill step of skin fabrication. The cutting with tool or knife 305 along the sidewall 132 cuts skin material but also cuts the guide 140 into a plurality of segments 341. Each of these segments 341 is retained or encapsulated within each of the tongues 322, 332 such that each tongue 322, 332 includes a guide for a retaining member or element (such as member 520 shown in FIG. 5). When the joint is closed with the tongues inserted into corresponding or mating grooves in the two sides 312, 314, the segments 341 become generally aligned to facilitate insertion of the retaining member or element. In this manner, too, each segment 341 typically has a length that is equal to the width, $W_{Tongue}$, of the tongue in which it is embedded. The segments 341 as well as the tongues and grooves of the joint 320 may be thought of as being integrally formed with the skin 310 as part of the skin molding or formation process, which allows each of these components of the joint to be more wear resistant, to move more sympathetically or naturally with the skin portions 312, 314, and to be retained within the skin 310 over time rather than tearing away as is common with foreign bodies/materials.

Figure 5:
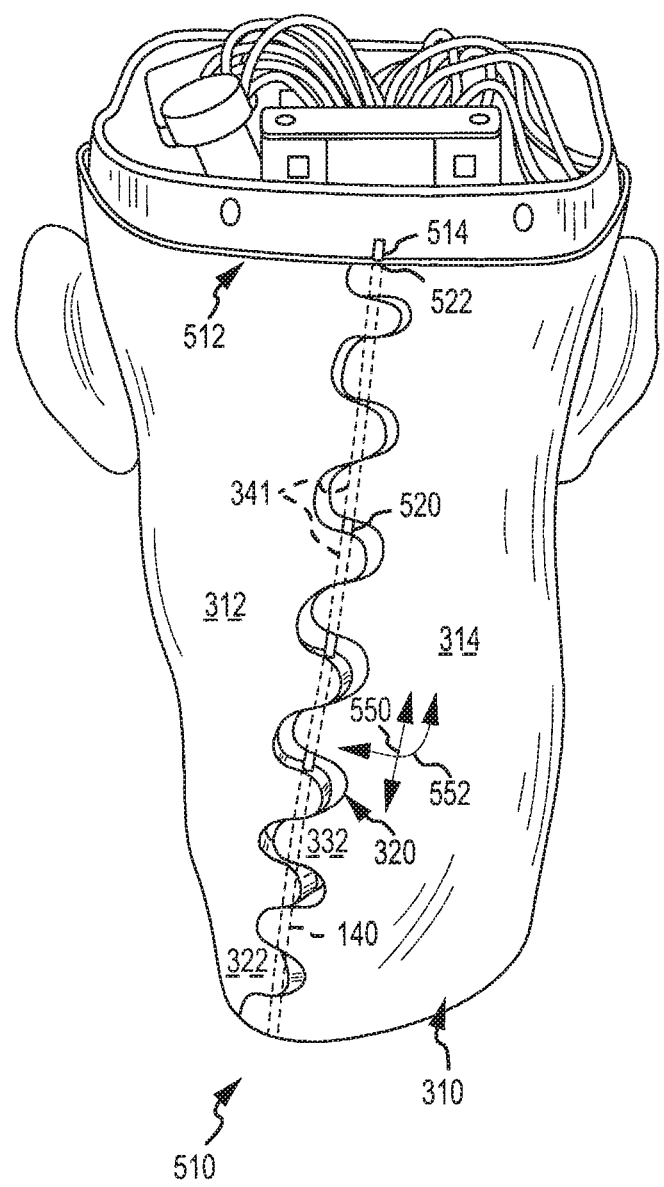
FIG. 5 illustrates a robotic figure with a robotic assembly (e.g., a head and neck) and a skin system of the present description covering the robotic assembly illustrating the inclusion of a retaining rod in the flexible guide segments within the plurality of tongues of the tongue and groove joint.

FIG. 5 illustrates an assembled (or partially assembled) robotic device 510 with a robotic assembly/mechanism 512 that has been covered (or partially covered/encased) with the skin or skin system 310. The device 510, in this non-limiting example, is a head and neck assembly and the skin 310 provides a unitary skin that fits over the face and neck of the device 510. As shown, the seam 320 has been closed with the sides 312 and 314 placed in adjacent and abutting or nearly abutting contact. In this position, the tongues 322, 332 have been inserted into receiving or mating grooves such as grooves 324, 334 (i.e., at least one tongue 322 from side 312 is inserted into a groove on side 314 and at least one tongue 332 from side 314 is inserted into a groove on side 312 to form the closed joint 320).

As shown, the joint 320 in skin 310 may be thought of as a staggered joint or a joint assembly made up of plurality of tongue and groove joints that alternate in their orientation (i.e., a tongue, groove, tongue, groove, and so on pattern on side 312 and a groove, tongue, groove, tongue, and so on pattern on side 314). The tongues and grooves do not run the length, $L_{Joint}$, of the joint 320 but instead extend the depth of the joint or skin thickness, $t_{Skin}$ (into the paper of FIG. 5). Instead of (or in addition to) the tongue and groove description, the joint 320 may be thought of as a staggered join of the sides 312, 314 provided by a repeating pattern of alternating peaks and valleys as may be provided with a repeating S-shaped pattern.

The peaks and valleys (or tongues and grooves) may have nearly any shape to practice the invention such as rectangular, triangular, or the like. However, in some cases, a rounded tongue body or tip is desirable such that the valleys/groove bottoms or bases are rounded. Rounded surfaces are useful in skin systems (such as a pattern of equidistant curves) because sharp corners and valleys can lead to tears in the elastic material (such as silicone) used for skin as the skin moves with the underlying or covered robotic mechanisms. The joint 320 is designed to allow a movement in nearly any direction as is shown with arrow 550 indicating stretching and compression along the length of or longitudinal axis of the joint 320 and with arrow 552 indicating a twisting movement about the axis of the joint 320 or even a side to side movement at a point along the length of the joint 320. The joint 320 is typically hidden from view of observers of the device 510 such that it is allowable and even useful in some senses (such as to facilitate movements) to allow some gapping or spreading of the two sides 312, 314 at the joint 320.

However, it is also typically desirable to maintain the seam in a joined arrangement or to "lock" the joint in a closed or coupled position with the tongues of side 312 in grooves of side 314 and vice versa. To this end, a retaining member or element 520 is included in the device 510 and extends through the guide segments 341 in adjacent tongues 322, 332. The end 522 of the retaining member 520 may be fastened to the robotic assembly/mechanism at anchor 514 (such as with a hook and eye arrangement or the like). With the retaining member or element 520 installed in guide assembly 140, the joint 320 is able to stretch and twist 550, 552 but adjacent pairs of the tongues 322, 332 are maintained in a proximate and often abutting arrangement (and a tongue is kept within its receiving or mating groove). The retaining member 520 is generally a unitary component and is flexible (not rigid). For example, the member 520 may be a flexible cable or rod formed of a plastic or similar material (e.g., a fiberglass rod) or a metal (such as a wire cable/rope or the like).

Figure 6:
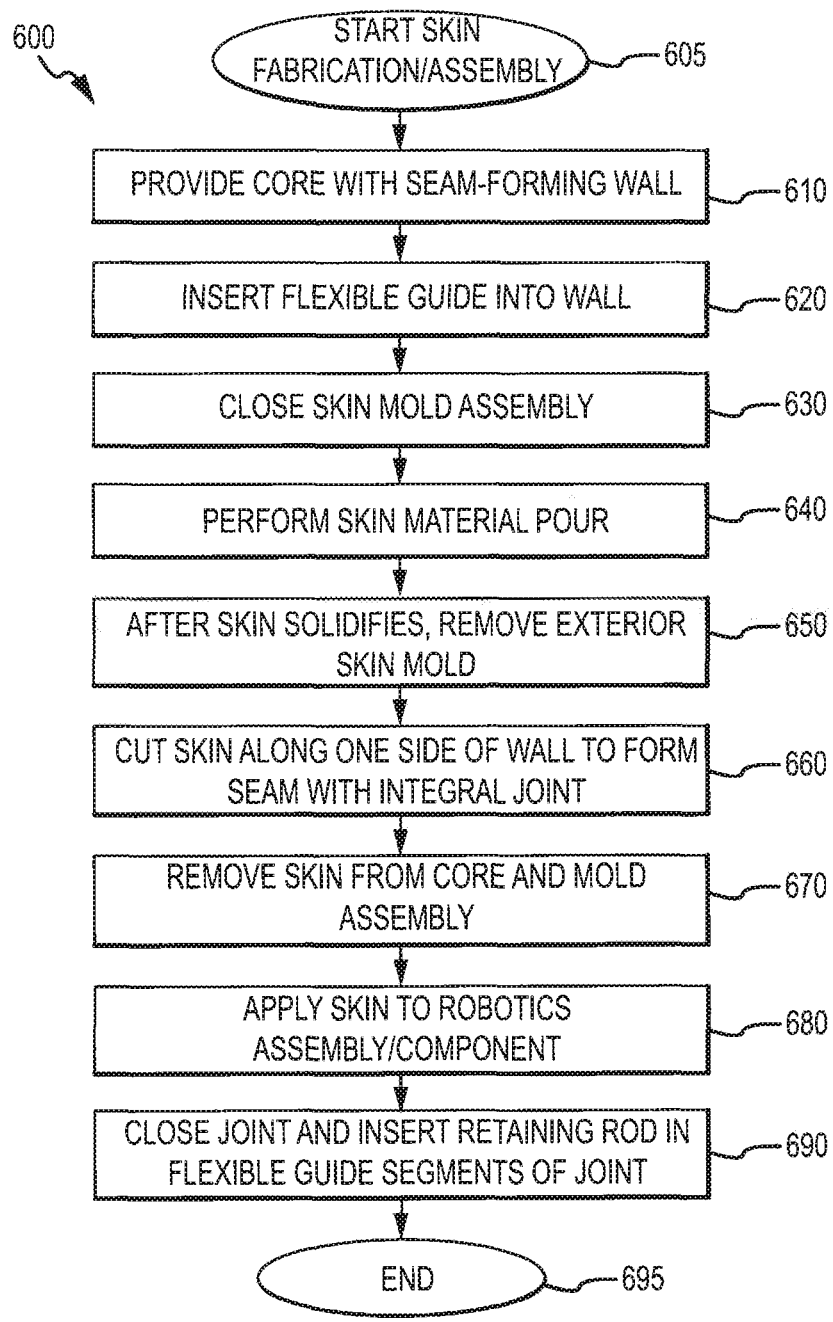

FIG. 6 illustrates a flow diagram for a method 600 of fabricating a skin or skin system with a staggered joint that is integral or unitarily formed with the skin. The method 600 starts at 605 such as with the design of a robotic mechanism that requires a skin covering and then the creating of a mold assembly (including sculpting or other processes) that defines the shape and thickness of the skin. At 610, the process 600 includes providing a core or inner skin support component of the mold assembly, and the core includes a wall extending up from one of its surfaces (or down from an inner surface of an exterior mold component in some embodiments). This wall defines the pattern of a staggered joint, and the wall includes a pathway such as a series of holes/openings for receiving a retaining member guide. At 620, the method 600 continues with the insertion of a flexible guide into the wall through these holes/openings. Step 620 may also include plugging or capping the ends of the tubular guide to avoid skin material entering and plugging up the inner chamber or lumen of the guide.

At 630, the skin mold assembly is completed and closed, which may include positioning the inner core onto a base and enclosing the core with two or more exterior mold or skin defining components. At step 640, the method 600 includes pouring skin material (such as a rubber that hardens to a desired hardness and provides a lifelike flexibility, stretchiness, and resilience) into the chamber defined between the exterior mold components and the inner core. In step 640, skin material flows against the sides of the seam-forming wall and encases the guide member. After the skin solidifies, at 650, all or a portion of the exterior mold is removed to expose the portion of the skin that includes seam/joint being formed with the wall on the core.

At 660, the method 600 continues with cutting through the skin along one or both sides of the seam-forming wall to form the seam in the skin with an integral, staggered joint. Step 660 also includes concurrent with cutting the skin material cutting the elongate guide into a plurality of segments that are each retained in the protrusions or tongues of the staggered joint. At step 670, the skin is removed from the core using the newly formed staggered joint (e.g., opening the joint). Some amount of clean up of the seam surfaces may be performed, but, in general, the creation of the joint using the S-shaped or other-shaped wall is a quick and easy process that requires less labor than a conventional zippered joint (which requires all or nearly all skin material to be removed from zipper teeth for proper performance).

At step 680, the skin with the staggered joint is applied to a robotics assembly or mechanism to form a skin-covered robotic device. The method 600 continues at 690 with closing the joint by interlacing pairs of peaks and valleys on the two sides of the formed joint (or mating appropriate tongues of skin on one side of the seam with associated or paired grooves of skin on a second side of the seam). Step 690 also includes inserting the flexible retaining member or element through the guide segments provided in the tongues or peak/protruding elements of the joint and, in some cases, affixing an end of the retaining member to the robotics assembly/mechanism. At 695, the method 600 is ended or repeated to create an additional skin at 610.

Typically, the components of the skin system will be elastic and flexible to allow manipulation by robotics. The material may be a plastic or, more typically a polyurethane or rubber. In some embodiments, the skin is formed of silicone such as a silicone foam or a silicone foam with additives such as a silicone and urethane foam. The skin with integral, staggered joint is typically fabricated by a single pour with the details of an original sculpt (that is used to create an exterior mold) to be picked up or created in outer surfaces of the skin. For example, a molding process may be followed in which fluid resin (e.g., a thermosetting, thermoplastic, or other resin with additives provided to cause the resin to solidify) is poured into a mold or frame into which the core with seam-forming wall has been placed. Concurrently, the pouring of the skin causes the guide member or element to become intrinsically bonded together (such as a crosslink or other bond between the materials of the differing components) such that the later formed guide segments are attached to the tongues/protruding elements to behave as an integral unit or skin system.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above examples have provided examples of using skin systems of the invention with robotics, but the skin or covering systems of the invention are, of course, readily adaptable and useful in other applications in which it is desirable to cover a still or rigid frame or support structure or a dynamic or movable frame or support structure in a way that allows ready access to covered components with a seam. As a result, the use of the term "skin" is not intended as being limited to human or animal imitating robots, toys, or devices, but it is instead to be inclusive of nearly any covering assembly or layered overlay that may be applied to or used as a covering (typically, but not always, an external covering).

Further, the staggered joint such as joint 320 may be formed with a modified version of method 600. For example, some embodiments call for the joint 320 (or staggered seam) to be formed without the use of a seam-forming wall in the core (or mold assembly). For example, the method 600 may be modified by having step 610 involve simply providing a core without the wall. Then, the step of inserting the flexible guide into the wall at 620 may be replaced by a step of providing the flexible guide in the mold assembly cavity where a seam is desired (e.g., to be aligned so as to run the length or much of the length of a planned seam or joint).

The step of providing the tube or guide may involve suspending the tube within the cavity proximate or adjacent to the core. For example, the flexible guide may be suspended using bent wire inside the tub that can be pulled out after the skin material hardens. The guide may be provided via tack glue to post off of the mold core. In other cases, the guide may be provided by pre-making/forming a strip of the skin-forming material (e.g., a silicone strip) with a tube or flexible guide embedded within it, and this strip may be placed within the cavity of the mold prior to pouring/filling the cavity.

With the guide embedded in the skin where the seam is to be formed, step 660 of the method 600 may be modified to include cutting the skin, without use of the wall as a guide, to form the seam in a zigzag pattern (such as repeating S-shapes) including cutting the embedded guide into segments (as discussed above). The cutting may be performed in many ways to practice the invention. For example, the staggered joint may be cut freehand with a blade or a custom cutting tool. The joint (such as joint 320) may be cut using a knife or cutting tool but using a preformed guide stencil, which could be made out of thick paper, plastic, or other materials. For example, a seam/joint pattern may be designed and a digital (e.g., a CAD) model formed of a stencil providing this pattern. The stencil may then be formed by printing it on a rapid prototype machine. The staggered joint may also be cut in the skin using a custom made stamp or cookie cutter-type of tool that could be concurrently pressed through the skin and the embedded guide to provide the skin or skin system shown in FIGS. 4 and 5.

We claim:

1. An artificial skin formed of an elastomeric material, comprising:
   a sheet of the elastomeric material;
   a seam cut through the sheet of elastomeric material to separate a first side from a second side of the seam;
   a first set of alternating tongues and grooves on an edge of the first side of the seam;
   a second set of alternating tongues and grooves on an edge of the second side of the seam, the grooves of the second set being adapted for receiving the tongues of the first set and the tongues of the second set being adapted for being inserted into the grooves of the first set;
   a plurality of guide segments, wherein one guide segment is embedded within each of the tongues of the first and second sets of tongues and grooves, wherein each of the guide segments has a rigid tubular body with an exposed interior wear surface and wherein the rigid tubular body is supported by material of the tongue with no other form of reinforcement in the tongue; and
   an elongate, flexible retaining member extending through the guide segments and contacting the rigid tubular body of each of the guide segments about a perimeter of the exposed interior wear surface, when the first and second sides of the seam are positioned with the tongues and grooves of the first and second sets interlaced together.

2. The skin of claim 1, wherein the first set of alternating tongues and grooves includes at least two of the tongues and two of the grooves.

3. The skin of claim 1, wherein the sheet of elastomeric material is formed by pouring a volume of an elastomer into a cavity of a mold defining a unitary skin for a robotic assembly and in which a tube providing the guide segments is positioned, whereby the guide segments and the tongues are integrally formed.

4. The skin of claim 3, wherein the mold includes a seam-forming wall with a zigzag pattern defining the first and second sets of the alternating tongues and grooves.

5. The skin of claim 1, wherein each of the tongues has a body with a rounded tip and each of the grooves comprises a rounded valley for receiving one of the rounded tips.

6. The skin of claim 1, wherein the retaining member comprises a flexible fiberglass rod.

7. The skin of claim 1, wherein the tubular body of each of the guide segments is formed of an abrasion-resistant material.

8. The skin of claim 1, wherein the tubular body of each of the guide segments comprises a peroxide-cured silicon tube.

9. An artificial skin, comprising:
   a sheet of elastomeric material;
   a seam cut through the sheet of elastomeric material to separate a first side from a second side of the seam;
   a first set of alternating tongues and grooves on an edge of the first side of the seam;
   a second set of alternating tongues and grooves on an edge of the second side of the seam, the grooves of the second set being adapted for receiving the tongues of the first set and the tongues of the second set being adapted for being inserted into the grooves of the first set; and
   a plurality of tubular guide segments, wherein one of the tubular guide segments is embedded within each of the tongues of the first and second sets of tongues and grooves to provide an integrally formed component with the elastomeric material encapsulating an outer surface of the one of the tubular guide segments, wherein no additional element is provided in the elastomeric material to retain the one of the tubular guide segments within the artificial skin, and wherein each of the tubular guide segments is formed of a rigid and abrasion-resistant material.

10. The skin of claim 9, further comprising an elongate and flexible retaining member extending through the guide segments when the first and second sides of the seam are positioned with the tongues and grooves of the first and second sets interlaced together.

11. The skin of claim 10, wherein the retaining member comprises a flexible fiberglass rod.

12. The skin of claim 10, wherein each of the tubular guide segments is integrally formed with one of the tongues such that an entire perimeter of an interior wear surface receives and abuts the retaining member.

13. The skin of claim 9, wherein the first set of alternating tongues and grooves includes at least two of the tongues and two of the grooves.

14. The skin of claim 9, wherein the sheet of elastomeric material is formed by pouring a volume of an elastomer into a cavity of a mold defining a unitary skin for a robotic assembly.

15. The skin of claim 14, wherein the mold includes a seam-forming wall with a zigzag pattern defining the first and second sets of the alternating tongues and grooves.

16. The skin of claim 9, wherein each of the tongues has a body with a rounded tip and each of the grooves comprises a rounded valley for receiving one of the rounded tips.

17. The skin of claim 8, wherein each of the tubular guide segments comprises a length of peroxide-cured silicon tube.

18. An artificial skin, comprising:
   a sheet of elastomeric material;
   a seam in the sheet separating a first side from a second side of the seam;
   a first set of alternating tongues and grooves on an edge of the first side of the seam; and
   a second set of alternating tongues and grooves on an edge of the second side of the seam, the grooves of the second set being adapted for receiving the tongues of the first set and the tongues of the second set being adapted for being inserted into the grooves of the first set,
   wherein the first set of alternating tongues and grooves includes at least two of the tongues and two of the grooves,
   further comprising a plurality of tubular guide segments embedded within each of the tongues of the first and second sets of tongues and grooves and an elongate and flexible retaining member extending through the guide segments when the first and second sides of the seam are positioned with the tongues and grooves of the first and second sets interlaced together,
wherein the tubular body of each of the guide segments is rigid and is formed of an abrasion-resistant material, and
wherein each of the tubular guide segments is supported within the tongue in which it is embedded by the elastomeric material with no additional reinforcements extending through the elastomeric material and about a periphery of each of the guide segments.

19. The skin of claim 18, wherein the sheet of elastomeric material is formed by pouring a volume of an elastomer into a cavity of a mold defining a unitary skin for a robotic assembly.

20. The skin of claim 19, wherein the mold includes a seam-forming wall with a zigzag pattern defining the first and second sets of the alternating tongues and grooves.

21. The skin of claim 18, wherein each of the tongues has a body with a rounded tip and each of the grooves comprises a rounded valley for receiving one of the rounded tips.

22. The skin of claim 18, wherein the retaining member comprises a flexible fiberglass rod.

23. The skin of claim 18, wherein each of the tubular guide segments comprises a length of peroxide-cured silicon tube.

24. The skin of claim 18, wherein each of the tubular guide segments is integrally formed with the tongue in which it is embedded.

25. The skin of claim 24, wherein each of the tubular guide segments is integrally formed with one of the tongues such that an entire perimeter of an interior wear surface receives and abuts the retaining member.

* * * * *